Feb. 6, 1951          H. G. HAAS          2,540,202
DYNAMOELECTRIC MACHINE
Filed Dec. 21, 1945          6 Sheets-Sheet 1
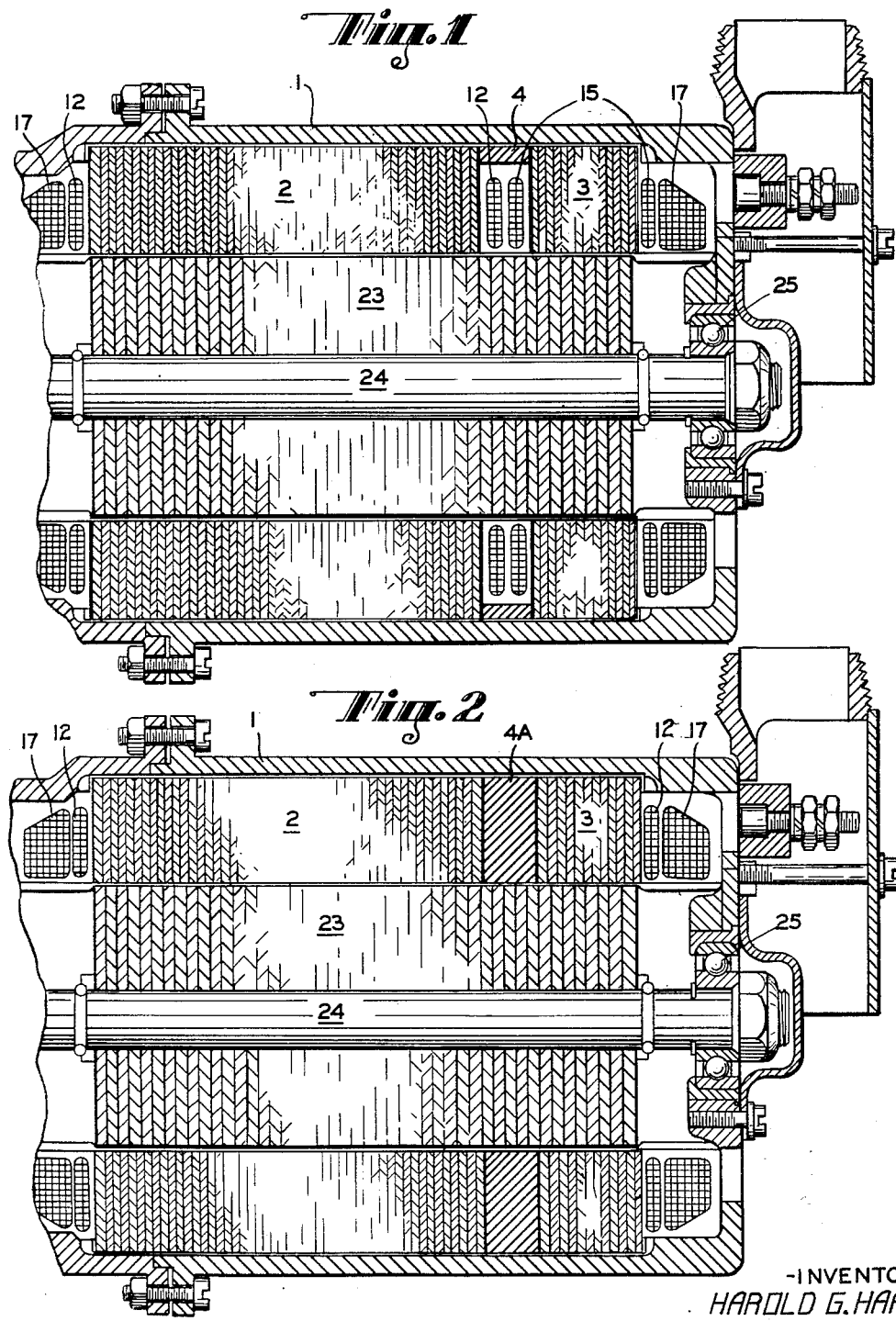
INVENTOR-
HAROLD G. HAAS
BY Herbert L. Davis Jr.
-ATTORNEY-

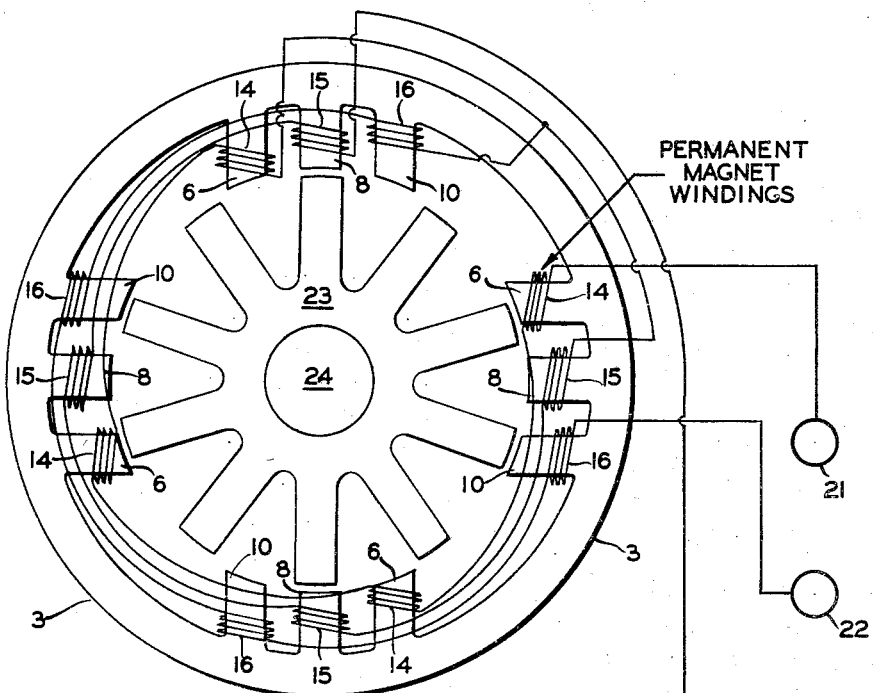
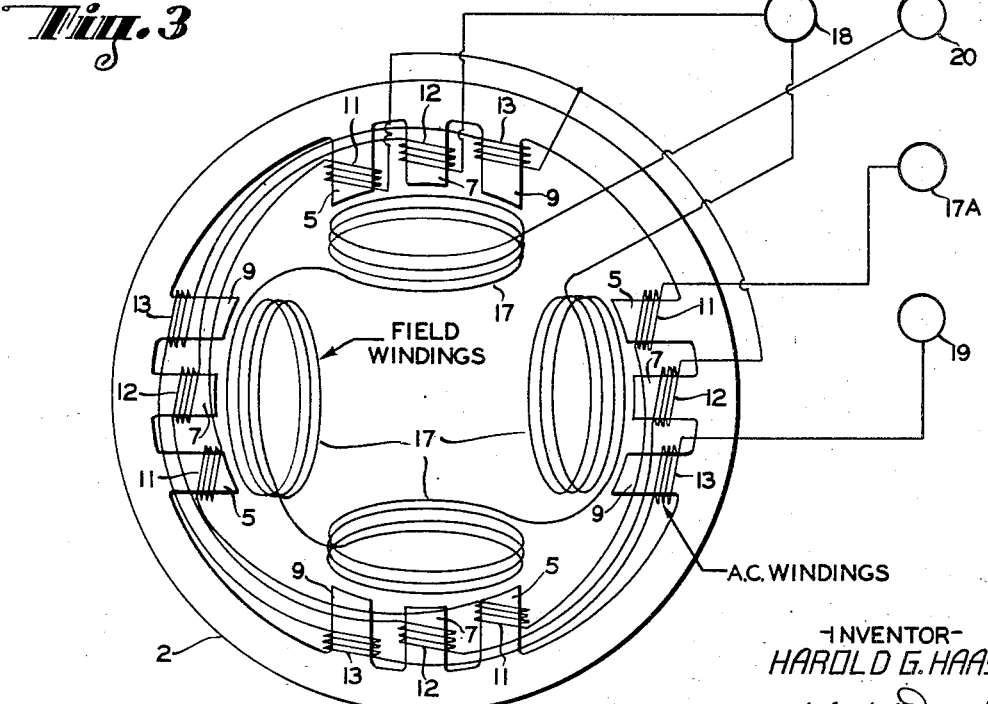
Fig. 3
INVENTOR-
HAROLD G. HAAS

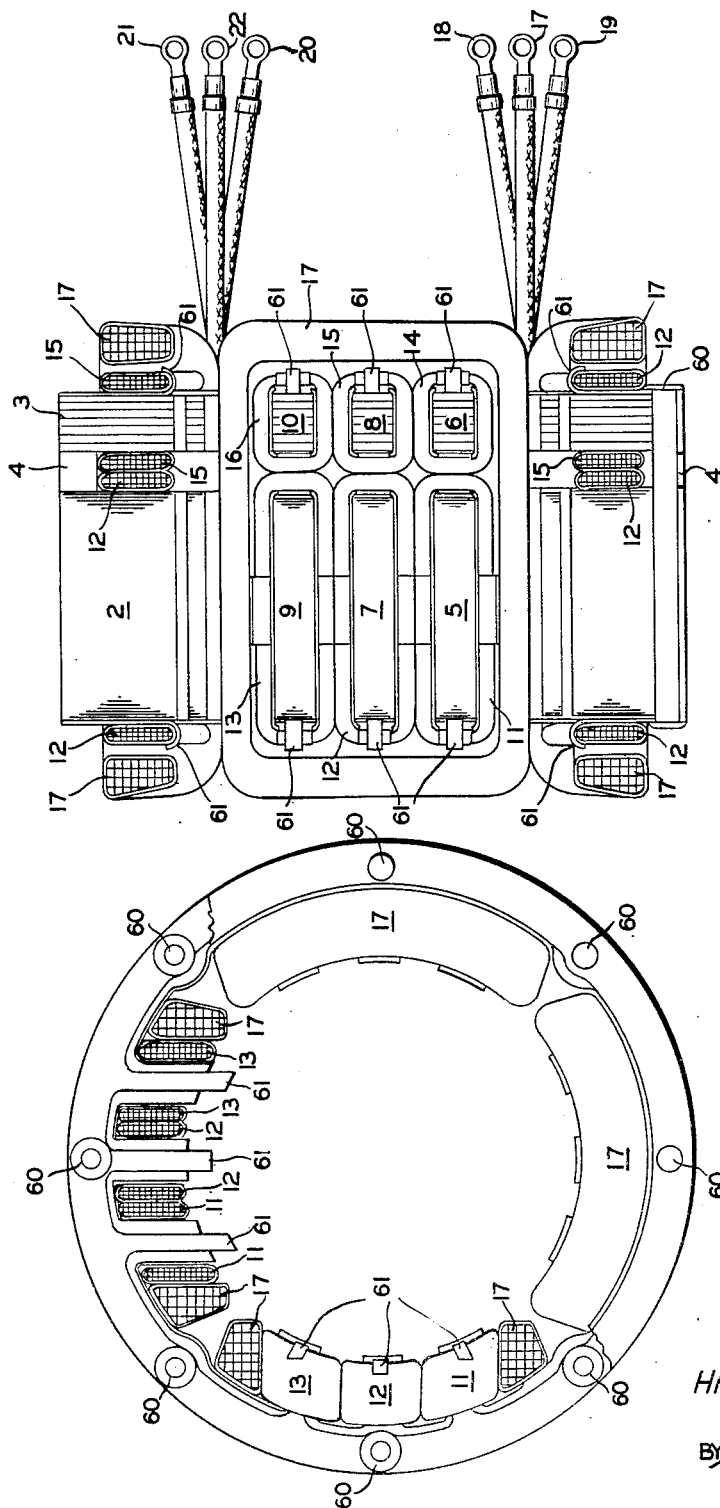

Feb. 6, 1951 H. G. HAAS 2,540,202
DYNAMOELECTRIC MACHINE
Filed Dec. 21, 1945 6 Sheets-Sheet 4

-INVENTOR-
HAROLD G. HAAS
BY Herbert Lawins Jr.
-ATTORNEY-

Feb. 6, 1951     H. G. HAAS     2,540,202
DYNAMOELECTRIC MACHINE
Filed Dec. 21, 1945     6 Sheets-Sheet 5
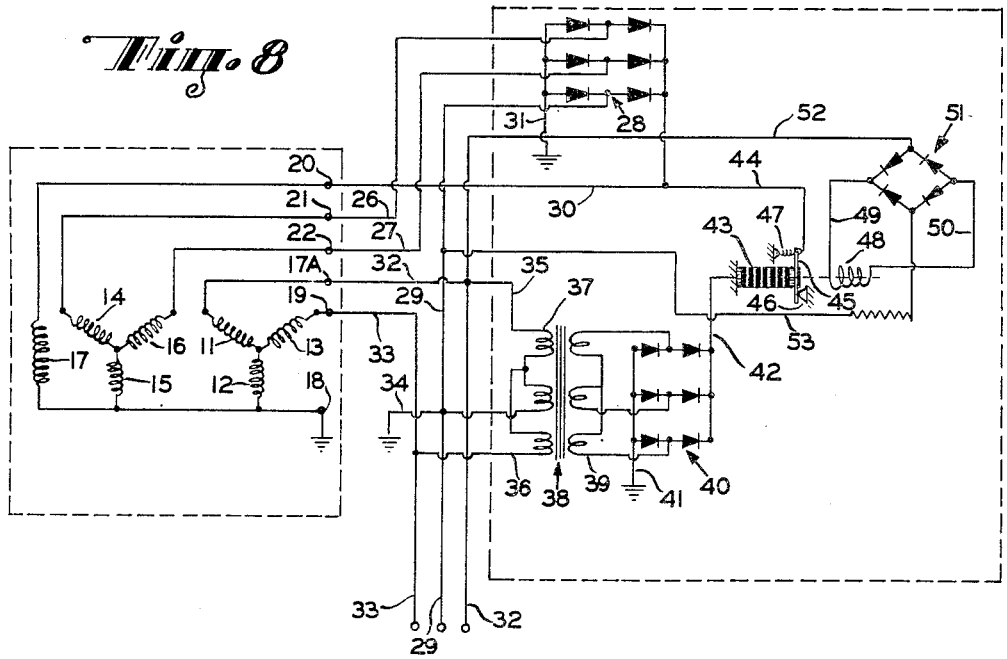
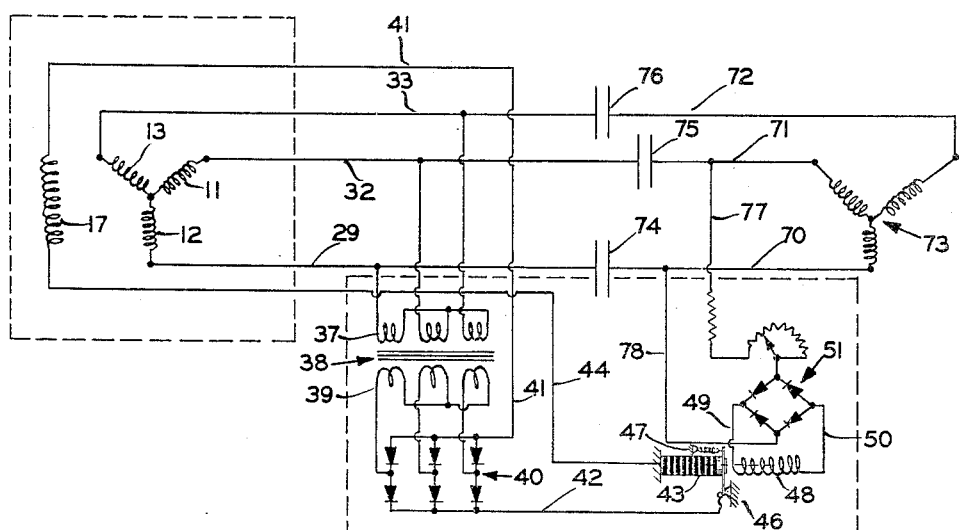
-INVENTOR-
HAROLD G. HAAS
BY
-ATTORNEY-

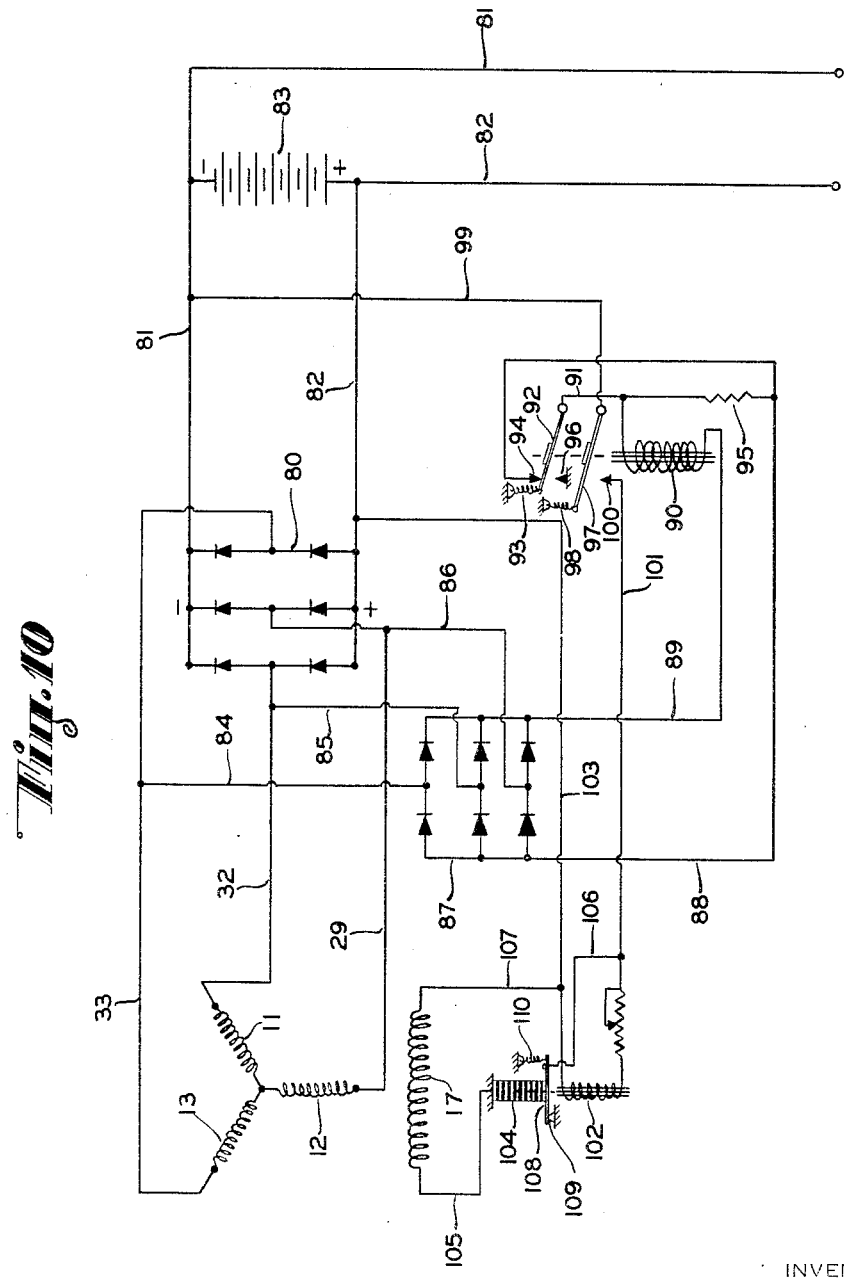

Patented Feb. 6, 1951

2,540,202

UNITED STATES PATENT OFFICE 2,540,202

DYNAMOELECTRIC MACHINE

Harold Gustow Haas, Belleville, N. J., assignor to Bendix Aviation Corporation, Teterboro, N. J., a corporation of Delaware Application December 21, 1945, Serial No. 636,451

7 Claims. (Cl. 322—59)

The present invention relates to generators and more particularly to control systems and apparatus for the self-excitation of an alternator.

An object of the invention is to provide an alternator having rotor and stator members and one of the said members having two sections of windings, one section to carry the load required and the other section to provide excitation of the alternator field.

Another object of the invention is to provide an induction type three phase alternator having two sets of three phase windings. One set of the three phase windings is for excitation purposes and the other set of three phase windings for carrying the required load.

Another object of the invention is to provide an alternator having a stator with a portion thereof made of a permanent magnet steel and a rotor cooperating therewith so as to effect an initial magnetic flux for inducing a current in the field winding of the alternator.

Another object of the invention is to provide a system in which the output from the exciter stator windings is applied through a three-phase rectifier to the exciting field of the alternator.

Another object of the invention is to provide a self-excited alternator in which the main output has a three phase step down transformer connected therefrom. The secondary of the transformer is connected through a three phase rectifier in parallel with the exciter circuit and to the exciting field of the alternator and the output of the last mentioned rectifier being so regulated as to maintain a predetermined output voltage at the main output lines.

Another object of the invention is to provide a novel alternator arranged so as to effect self-excitation without exciter windings, armature windings, commutator or brushes and with a minimum of moving parts.

Another object of the invention is to provide a three phase alternator having a main section formed of a ferro-magnetic material, an auxiliary section formed of a permanent magnet, a spacer formed of a non-magnetic material separating the main section from the auxiliary section so as to prevent the leakage of magnetic flux from the auxiliary to the main section and a rotor formed of a ferro-magnetic material having teeth arranged so as to effect a pulsating flow of magnetic flux between opposite poles of the auxiliary section so as to generate a current in three phase windings about the stator and initiate an exciting current for the alternator field winding.

Another object of the invention is to provide a novel alternator construction having a stator and rotor arranged to effect a three phase inductor type operation. The stator has four poles and twelve stator teeth spaced in groups of three, and all teeth of each phase wound with the same polarity and connected in series, together with a field coil placed around each group of three teeth. There is further provided a rotor having ten teeth equally spaced apart for making and breaking magnetic lines of force passing through the respective stator and rotor teeth.

Another object of the invention is to provide in the latter arrangement series capacitors connected in the three phase output lines of the alternator to counteract the demagnetizing effect of an inductive load on the stator winding of the alternator. The latter capacitors are so arranged as to introduce a leading current vector which is in phase with the flux or magnetizing vector and out of phase with the demagnetizing current vector resulting from the load so as to counteract the latter demagnetizing effect of the load on the stator windings of the alternator.

Another object of the invention is to provide a third form of control system for a self-excited alternator, including a relay operated by the output of the exciter windings so as to close a circuit of a control coil for a carbon pile voltage regulator and connect the exciting field of the alternator to the output of the alternator. The relay is arranged so as to open the circuit to the regulator and the exciting field from the output of the alternator at low rotor speeds so as to thereby prevent loss of current from a battery in the output circuit.

These and other objects and features of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claims for this purpose.

In the drawings:

Figure 1 is a longitudinal sectional view of one form of alternator constructed in accordance with the present invention.

Figure 2 is a longitudinal sectional view of a modified form of alternator embodying the invention.

Figure 3 is a circuit diagram illustrating the manner of connecting the several windings of the device of Figure 1.

Figure 4 is an end view of the stator of a modified form of the invention of Figure 1 and illustrating the manner of mounting the several windings.

Figure 5 is a longitudinal sectional view of the stator of Figure 4 illustrating the several stator windings.

Figure 8 is a diagrammatic view illustrating a control circuit for the device shown in Figure 3.

Figure 9 is a diagrammatic view illustrating a control circuit for the device shown in Figure 2.

Figure 10 is a diagrammatic view illustrating a modified form of control circuit for the device of Figure 2.

Figure 7:
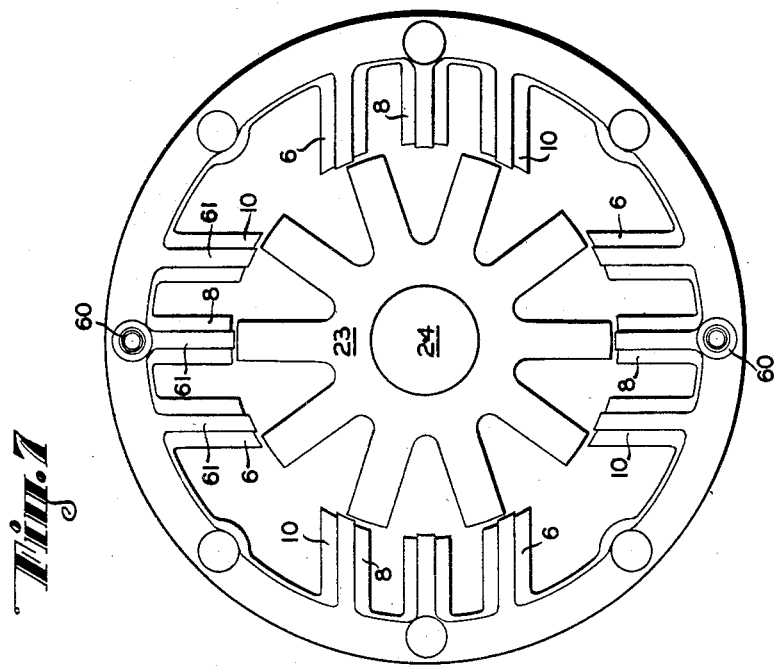
Figure 7 is an end view of Figure 6 with the rotor in operating position.
Figure 6:
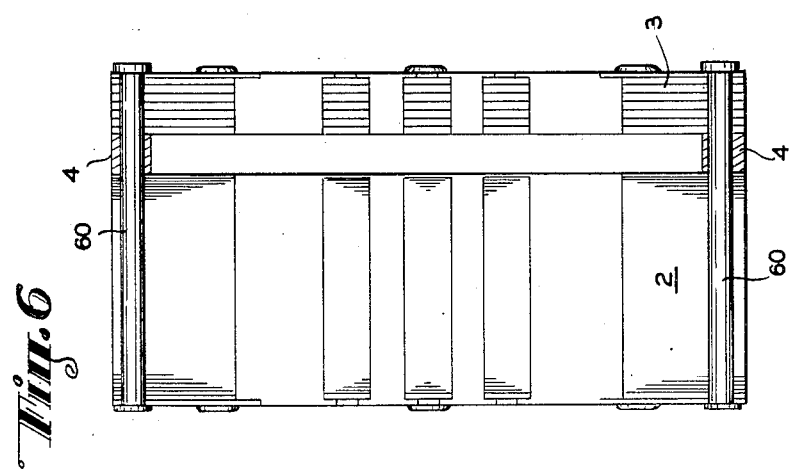
Figure 6 is a longitudinal sectional view of the stator of Figure 5 with the stator windings removed.

Referring to the form of the invention shown in Figure 1, there is depicted a dynamoelectric machine having an outer casing 1 in which is mounted a stator including a main section 2, and an auxiliary section 3.

The main stator section 2 is preferably formed of a series of laminations or punchings made of a ferro-magnetic material while the auxiliary stator section 3 is preferably formed of laminations of punchings of a permanent magnet steel.

The main stator section 2 and the auxiliary stator section 3 are separated by a non-magnetic spacer or ring made of a suitable material such as aluminum and indicated by the numeral 4. The stator assembly may be fastened together by cement or other suitable means. The purpose of the spacer 4 is to prevent magnetic flux from leaking from the auxiliary permanent magnetic section through the main section.

The main and auxiliary stator sections as shown in Figure 3 are formed with four magnetic poles and have twelve stator teeth spaced in groups of three. The first tooth in each group is indicated in Figure 3 for example by the numeral 5 on the main section 2 and by numeral 6 on the auxiliary section 3; the second tooth on the main section 2 is indicated by the numeral 7 and by numeral 8 on the auxiliary section 3; and the third tooth is indicated by numeral 9 on the main section 2 and by numeral 10 on the auxiliary section 3.

Main windings 11, 12 and 13 are wound about the teeth 5, 7 and 9, respectively, so as to provide the same polarity and are connected in series. Similarly exciter windings 14, 15 and 16 are wound about the teeth 6, 8 and 10, respectively, so as to provide the same polarity and are connected in series.

A field coil 17 is wound around each group of teeth of the main and auxiliary stators 2 and 3, as shown in Figure 1. The field coils 17 are each wound with the same polarity and are connected in series.

Conductors lead from the main windings 11, 12 and 13 to posts 17A, 18 and 19. One end of the field winding 17 leads to the post 18 while the opposite end is connected to post 20. Similarly, conductors lead from the exciter windings 14, 15 and 16 to posts 21, 18 and 22, respectively. The post 18 serves as a common connector for windings 12, 15 and 17.

Mounted within the main and auxiliary stator sections 2 and 3 is a rotor 23 formed preferably of laminations or stampings of ferro-magnetic material and affixed to a drive shaft 24 supported at opposite ends by suitable anti-friction bearings, one of which is indicated herein at one end of the shaft 24 by the numeral 25. The opposite end of the shaft 24 may be driven by an engine or other power means through a suitable constant speed drive which may be of a type such as described and claimed in the U. S. Patent No. 2,033,835 granted March 10, 1936, in the name of Raymond P. Lansing.

The rotor 23 is formed with a plurality of teeth illustrated in Figure 7 as ten equally spaced teeth, thirty-six degrees apart and so arranged that upon rotation of the shaft 24 the rotor teeth successively make and break a magnetic circuit through adjoining teeth of the auxiliary stator section and adjoining teeth of the main stator section.

The purpose of the permanent magnet punchings in the auxiliary stator section is to provide an initial flux for generating a voltage in the exciter windings 14, 15 and 16.

As shown in Figure 8 the exciter windings 14 and 16 are connected through conductors 26 and 27 to the input of a three phase rectifier 28 while winding 15 is connected through grounded post 18 and grounded conductor 29 to the input of the rectifier 28.

The rectifier 28 has output lines 30 and 31. The line 30 is connected to post 20 and thereby to one end of the field winding 17 while the other output line 31 is grounded and connected to the opposite end of the field winding 17 through the grounded post 18.

Thus the exciter windings 14, 15 and 16 provide through the rectifier 28 an initial voltage for the exciting field winding 17.

The main windings 11 and 13 are connected through posts 17 and 19 to main output lines 32 and 33, respectively, while winding 12 is connected through grounded post 18 to grounded output line 29.

Conductors 34, 35 and 36 lead from the output lines 29, 32 and 33, respectively, to primary windings 37 of a step down transformer indicated generally by the numeral 38. The transformer 38 has secondary windings 39 which lead to the input of a three phase rectifier 40.

The rectifier 40 has output conductors 41 and 42. The output conductor 41 is grounded and connected to the field winding 17 through grounded post 18. The output conductor 42 leads to one end of a variable resistance 43 which may be of the carbon pile type. The opposite end of the variable resistance 43 is connected by a conductor 44 to the conductor 30 and through post 20 to the field winding 17.

It will be seen then that as soon as the voltage in main windings 11, 12 and 13 starts to build up the transformer 38 rectifier 40 combination as shown in Figure 8 feeds rectified A. C. power into the field 17 in addition to that from the exciter windings 14, 15 and 16. The output of the rectifier 40 is connected to the field winding 17 in parallel to the output of the rectifier 28 supplied by the exciter windings 14, 15 and 16.

The output of the rectifier is regulated by a voltage responsive mechanism which controls the variable resistance 43 so as to maintain a predetermined voltage output on the main lines 29, 32 and 33.

The latter control mechanism is shown diagrammatically in Figure 8 as including an armature 45 pivoted at 46 and exerting a compressive force upon the carbon pile 43 under tension of a spring 47. An electromagnetic winding 48 is provided for adjusting armature 45 and the spring 47 is arranged so as to balance the magnetic pull on the armature 45 by the electromagnetic winding 48 when the winding 48 is energized by a voltage having a predetermined value. The control mechanism is preferably of a type such as shown in the patent application Serial No. 570,002 of William G. Neild filed December 27, 1944, now U. S. Patent No. 2,427,805.

The electromagnetic winding 48 is connected by conductors 49 and 50 to the output of a rectifier 51 having its input connected through lines 52 and 53 across the main output lines 29 and 32.

The control coil 48 by varying the resistance of the carbon pile 43 and thereby the excitation of the field winding 17 is arranged so as to maintain a substantially constant output voltage in the lines 29, 32 and 33 under varying load condition, since upon increase in load causing a decrease in voltage across the lines 29 and 32 the voltage applied to winding 48 will decrease causing spring 47 to decrease the resistance of the carbon pile 47 and increase the excitation of the field winding 17. A decrease in load will cause the electromagnetic winding 48 to effect an increase in the resistance of the carbon pile so as to maintain a predetermined voltage output at the lines 29, 32 and 33.

In the operation of the device due to the arrangement of the teeth of the rotor 23 as shown in Figures 3 and 7 with respect to the teeth of the main and auxiliary stators there will be induced in the windings 11 and 14 an alternating current having a first phase; in the windings 12 and 15 an alternating current having a second phase; and in the windings 13 and 16 an alternating current having a third phase. The voltage in the windings 14, 15 and 16 is initially induced, respectively, through action of the magnetic flux from the permanent magnet auxiliary stator teeth 6, 8 and 10 and the opening and closing of the magnetic circuit therefrom through action of the teeth of the rotor 23.

The latter voltage serves to initially excite the field winding 17 which in turn sets up a magnetic field in the main stator teeth 5, 7 and 9.

The teeth of the rotor 23 serve to open and close in like manner a magnetic circuit from the latter teeth 5, 7 and 9 so as to induce a voltage in the main stator windings 11, 12 and 13.

As soon as the output voltage from the main stator windings 11, 12 and 13 starts to build up, the transformer 38 rectifier 40 combination of Figure 8 feeds an additional rectified A. C. voltage from the latter main stator windings into the exciting field 17. The output voltage from the main windings 11, 12 and 13 will then come to a rated value through regulation of the carbon pile 43, as previously described.

In Figures 4, 5, 6 and 7, a slightly modified form of the invention is shown in which corresponding numerals to those in Figures 1 and 3 indicate corresponding parts.

In the modified form of the invention, the stator laminations or punchings are shown fastened together by rivets 60. Further the opposite end plates of the stator assembly have tab members 61 corresponding to each of the stator teeth and arranged to be turned over the stator teeth windings as shown in Figures 4 and 5, so as to better hold the latter windings in position. The form of the invention shown in Figures 4, 5, 6 and 7 is otherwise essentially the same as that shown in Figures 1 and 3 as indicated by corresponding numerals.

A further modified form of the invention is shown in Figure 2, now the subject matter of Divisional Application Serial No. 165,151, filed May 31, 1950, in which the stator assemblage and rotor construction is essentially the same as previously described with reference to the form of the invention described in Figures 1, 3, 4, 5, 6 and 7 except that the exciter windings 14, 15 and 16 are eliminated and the windings 11, 12 and 13 shown in Figure 3 surround not only the main stator teeth 5, 7 and 9 but also pass about the permanent magnet auxiliary teeth 6, 8 and 10. A spacer 4A formed of a non-magnetic material may be positioned in the space between the permanent magnet auxiliary stator section 3 and the main stator section 2 as shown in Figure 2 to prevent the leakage of magnetic flux from the auxiliary section 3 to the main section 2.

A control circuit for the latter form of the invention is shown in Figure 9 in which corresponding numerals indicate corresponding parts to those shown in Figure 8.

In the operation of the form of the invention shown in Figures 2 and 9 rotation of the rotor 23 causes the permanent magnet auxiliary stator 3 to induce an initial voltage directly into the main windings 11, 12 and 13 which through the transformer 38 rectifier 40 combination is fed back to the field winding 17. Then as the voltage at the output lines 29, 32 and 33 starts to build up due to the additional magnetic flux set up in the main stator 2 the transformer 38 and rectifier 40 combination of Figure 9 feeds additional rectified A. C. power to the exciting field 17.

Connected in series between the output lines 29, 33 and 32 and input lines 70, 71 and 72 of an inductance load indicated generally by the numeral 73 are capacitors 74, 75 and 76, respectively.

When an inductive load is applied to the output of the alternator the alternating current from the main alternator windings sets up in the inductive load a self induced counter electromotive force which tends to oppose the applied electromotive force of the alternator and the electromagnetic force of the field winding 17 and the permanent magnets 6, 8 and 10 so as to tend to demagnetize the alternator. In order to overcome the latter effect the series capacitors 74, 75 and 76 are inserted in the alternator output so as to provide capacitive reactance for counteracting the effects of the inductive reactance on the alternator.

Thus the capacitors 74, 75 and 76 counteract the demagnetizing effect on the alternator of the inductive load which would otherwise tend to cause the alternator to lose its excitation. The value of the capacitors selected will assure any desired amount of excitation and if desired may be varied with the inductive load to assure the proper balance between inductive and capacitive reactance.

Lines 77 and 78 are connected across the input lines 70 and 71 of the inductive load 73 and lead to the input of rectifier 51. Output lines 49 and 50 lead from the rectifier 51 to the control coil 48. The control coil 48 regulates the carbon pile 43 connected in circuit with the field 17 so as to maintain a predetermined output voltage from the alternator across the lines 70—71 in a manner previously described.

A third control circuit for the alternator of Figure 2 is shown diagrammatically in Figure 10 and corresponding numerals indicate corresponding parts.

In the latter control circuit of Figure 10 the alternator output lines 29, 32 and 33 are connected to the input of a three way rectifier 80 having direct current output lines 81 and 82 across which may be connected a battery 83 to be charged from the latter supply of direct current.

Lines 84, 85 and 86 lead from the alternator output lines 29, 32 and 33 to the input of a second three phase rectifier 87 having direct current output lines 88 and 89.

The line 88 is connected to one end of an electromagnetic winding 90, while the opposite end of the winding 90 is connected by conductor 91 to a relay switch arm 92 controlled by the electromagnetic winding 90. The relay switch arm 92 is biased under tension of a spring 93 into a position closing a contact 94 to which there is connected the output line 88 of the rectifier 87. A resistor 95 is connected across the switch 92 and a stop 96 limits the movement of the switch arm 92 in a switch opening direction under force of the electromagnetic winding 90.

A second relay switch arm 97 is also controlled by the electromagnetic winding 90 and is biased under tension of a spring 98 in an open circuit position.

The switch arm 97 is connected through a conductor 99 to the direct current output line 81 of the rectifier 80. The latter switch arm 97 cooperates with a switch contact 100 and is arranged to close the same under the magnetic force of the electromagnetic winding 90.

A conductor 101 leads from the contact 100 to one end of an electromagnetic winding 102. The opposite end of the winding 102 is connected through a conductor 103 to the output line 82. The electromagnetic winding 102 is arranged to regulate a variable resistance carbon pile 104 connected at one end by a conductor 105 to the field winding 17 and at the opposite end by a conductor 106 to the conductor 101. The field winding 17 is connected at the other end to the conductor 103 by a conductor 107.

The resistance of the carbon pile 104 is controlled by an armature 108 pivoted at 109 and exerting a compressive force upon the carbon pile 104 under the tension of a spring 110. The electromagnetic winding 102 is arranged to adjust the armature 108 against the biasing force of the spring 110. The spring 110 is arranged so as to balance the pull on armature 108 by the electromagnetic winding 102 when the winding 102 is energized by a voltage having a predetermined value. The carbon pile regulator is preferably of a type such as shown in the patent application Serial No. 570,002 of William G. Neild filed December 27, 1944; now U. S. Patent No. 2,427,805.

In the operation of the control system of Figure 10 it will be seen that upon initial operation of the alternator the respective relay switch arms 92 and 97 will be in the position shown and upon rotation of the rotor 23 of the alternator shown in Figure 2, the permanent magnets 3 will cause the induction into the main windings 11, 12 and 13 of a three phase alternating current. Upon the latter exciting voltage reaching a predetermined value the voltage across the electromagnetic winding 90 will cause the relay switch arm 92 to open contact 94 and switch arm 97 to close contact 100. The opening of the contact 94 which is normally closed inserts the resistor 95 in series with the electromagnetic winding 90 so as to limit the energizing current to a safe value for continuous duty operation.

The closing of the contact 100 by the switch arm 97 closes the energizing circuit for the control winding 102 and the energizing circuit for the field winding 17.

The latter action connects the battery 83 and the direct current output of the rectifier 80 to the exciting field 17 of the alternator through carbon pile 104.

The control winding 102 maintains the charging voltage of the battery 83 at a predetermined value by controlling the resistance of the carbon pile and thereby the excitation of the field winding 17 in response to the charging voltage across the output lines 81 and 82.

At a predetermined minimum alternator speed the voltage across the lines 88 and 89 decreases to a predetermined low value permitting the switch arm 97 to open contact 100 and thereby disconnect the control winding 102 and field winding 17 from the lines 81 and 82 so as to prevent the battery from loss of energy through the field winding 17 and control winding 102.

From the foregoing it will be seen that I have provided a novel self excited alternator and control system therefor in which no exciter windings, armature windings, commutator or brushes are required to effect its operation and an alternator having a minimum number of moving parts.

Although only three embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. An apparatus of the character described, comprising, in combination, a stator member, a rotor member, one of said members including a main section and an auxiliary section, the auxiliary section being in the form of a permanent magnet, a main winding about said main section, an exciter winding about said auxiliary section, and a field winding about said main and auxiliary sections, means electrically connecting said exciter and field windings, and said rotor member being so arranged that upon rotation thereof a voltage may be induced in the exciter winding so as to effect excitation of said field winding.

2. The combination comprising a rotor member, a stator member, the stator member including a main section at one end and an auxiliary section at the opposite end, the auxiliary section being in the form of a permanent magnet, a field winding about both sections, a main winding about the main section and having main output lines connected to a load, an exciter winding about the auxiliary section, means electrically connecting the field winding across the exciter winding, and said rotor cooperating with both sections of said stator member so as to cause a pulsating magnetic flux to flow for inducing a voltage in said main and exciter windings and initial excitation of said field winding.

3. An induction type alternator comprising two sets of three phase windings, a field winding, a permanent magnet and a rotor member cooperating therewith so as to induce a voltage in one set of said three phase windings, said other set of three phase windings having output lines for connection to a load, a first three phase unidirectional rectifier electrically connecting said one set of three phase windings to said field winding, a three phase step-down transformer having primary and secondary windings, a second three phase unidirectional rectifier having input and output lines, said primary windings being connected across the output lines of said other set of three phase windings, said secondary windings being connected to the input lines of said second three phase unidirectional rectifier, and the output lines of said second rectifier being connected to said field winding in parallel to said first rectifier.

4. An induction type alternator comprising two sets of three phase windings, a field winding, a permanent magnet and a rotor member cooperating therewith so as to induce a voltage in one set of said three phase windings, said other set of three phase windings having output lines for connection to a load, a first three phase unidirectional rectifier electrically connecting said one set of three phase windings to said field winding, a three phase step-down transformer having primary and secondary windings, a second three phase unidirectional rectifier having input and output lines, said primary windings being connected across the output lines of said other set of three phase windings, said secondary windings being connected to the input lines of said second three phase unidirectional rectifier, and the output lines of said second rectifier being connected to said field winding in parallel to said first rectifier, and means regulating the output of said second rectifier in response to voltage across the output of at least one phase of said other set of three phase windings.

5. A dynamo electric machine including a stationary member and a rotatable member, both of said members being formed of a magnetic material, means including a non-magnetic spacer for dividing the stationary member transversely into a pair of substantially separate parallel magnetic circuits, one of said circuits including a permanent magnet, and the other of said circuits including a field exciting winding arranged for providing a component of excitation to the other of said magnetic circuits, another winding at least in part in said one circuit and electrically connected to said field winding, and said rotatable member arranged in said one circuit so as to effect upon rotation thereof a pulsating magnetic flux from said permanent magnet for causing energization of said other winding and thereby the initial excitation of said field winding.

6. An induction type alternator comprising, a stationary member, a non-magnetic spacer for dividing the stationary member transversely into a pair of substantially separate magnetic circuits, one of said circuits including a permanent magnet, a rotatable member, said stationary member having a plurality of magnetic poles and a set of three teeth at each pole, windings for said teeth wound with the same polarity and at least in part in said one magnetic circuit, each of said windings connected in series with a winding about a corresponding tooth at other of said poles and in parallel to the windings about other of said teeth, a field coil connected in series with said first mentioned windings and placed around each group of three teeth of said magnetic circuits, and said rotatable member having a plurality of radial teeth equally spaced apart for making and breaking magnetic lines of force passing through the respective stator and rotor teeth.

7. A dynamo electric machine comprising, in combination, a stationary member having a main section formed of a ferro-magnetic material and an auxiliary section formed of a permanent magnet having opposite poles, a spacer formed of a non-magnetic material to divide the main and auxiliary sections into a pair of substantially separate parallel magnetic circuits and separating the main section from the auxiliary section so as to prevent the leakage of magnetic flux from the permanent magnet to the main section, a rotatable member formed of a ferro-magnetic material and having teeth arranged so as to effect a pulsating flow of magnetic flux between opposite poles of the auxiliary section upon rotation of said member, a field winding wound about said main and auxiliary sections, an exciter winding wound at least in part about said auxiliary section, and said pulsating magnetic flux effecting excitation of said field winding through said exciter winding.

HAROLD GUSTOW HAAS.

REFERENCES CITED

The following references are of record in the file of this patent:

UNITED STATES PATENTS

| Number | Name | Date |
|---|---|---|
| 1,058,244 | Pontois | Apr. 8, 1913 |
| 1,953,141 | Wagner | Apr. 3, 1934 |
| 1,993,824 | Bohli et al. | Mar. 12, 1935 |
| 2,108,662 | Fisher | Feb. 15, 1938 |
| 2,208,416 | Friedlander et al. | July 16, 1940 |
| 2,220,755 | Edwards | Nov. 5, 1940 |
| 2,393,044 | Harder | Jan. 15, 1946 |
| 2,414,287 | Crever | Jan. 14, 1947 |